Dec. 22, 1970 P. M. SCACCIA 3,549,225

PHONOGRAPH RECORD HOLDER

Filed Feb. 6, 1969

INVENTOR.
PHILIP M. SCACCIA,
BY Wolfe, Hubbard, Voit & Osann
ATTORNEYS.

United States Patent Office 3,549,225

Patented Dec. 22, 1970

3,549,225

PHONOGRAPH RECORD HOLDER

Philip M. Scaccia, 302 W. Windsor Ave., Lombard, Ill. 60148

Filed Feb. 6, 1969, Ser. No. 797,107
Int. Cl. A47b *81/06;* A47f *1/04;* G11b *1/00*
U.S. Cl. 312—10 3 Claims

ABSTRACT OF THE DISCLOSURE

A pop-up record folder is disclosed in which a record is received within an inner envelope and caused to stand upright by a pair of opposed folding support members when the front and rear cover panels of the folder are spread open.

The present invention relates to protective folders for disc objects, and more particular to a pop-up type phonograph record holder.

Modern high fidelity disc recordings are exceedingly delicate and must be handled carefully to avoid damage. They are generally made of a relatively soft plastic vinyl material which is easily scratched and tends to pick up dust, dirt and oil from the fingers. For this reason it is practically a ritual with the users of high fidelity equipment to handle the disc records only by the edges, which almost necessarily means using both hands to insert or remove the record from its protective jacket.

However, nearly every high fidelity enthusiast has found that it is practically impossible to simultaneously use both hands in inserting or removing a phonograph record because one hand must be used to support the jacket itself. A record is handled in this fashion by holding the jacket with one hand and attempting to slide the record in or out with the other while avoiding contact with the recorded surface. Needless to say, this is a technique which is not easily mastered by everyone.

In view of the foregoing, it is a principal object of the present invention to provide an improved phonograph record jacket or folder which may be spread open on any flat surface and which presents a phonograph record in a firmly supported upright position so that the record may be safely and easily removed, handled, and returned to the folder.

It is a further object to provide a record folder of the above description which may be easily and inexpensively made, and in which no telescoping panels or other complex devices are required.

Other objects and advantages of the invention will become apparent upon reading the following detailed description and upon reference to the drawings, in which.

Figures 1, 2, 3, 4, 5:
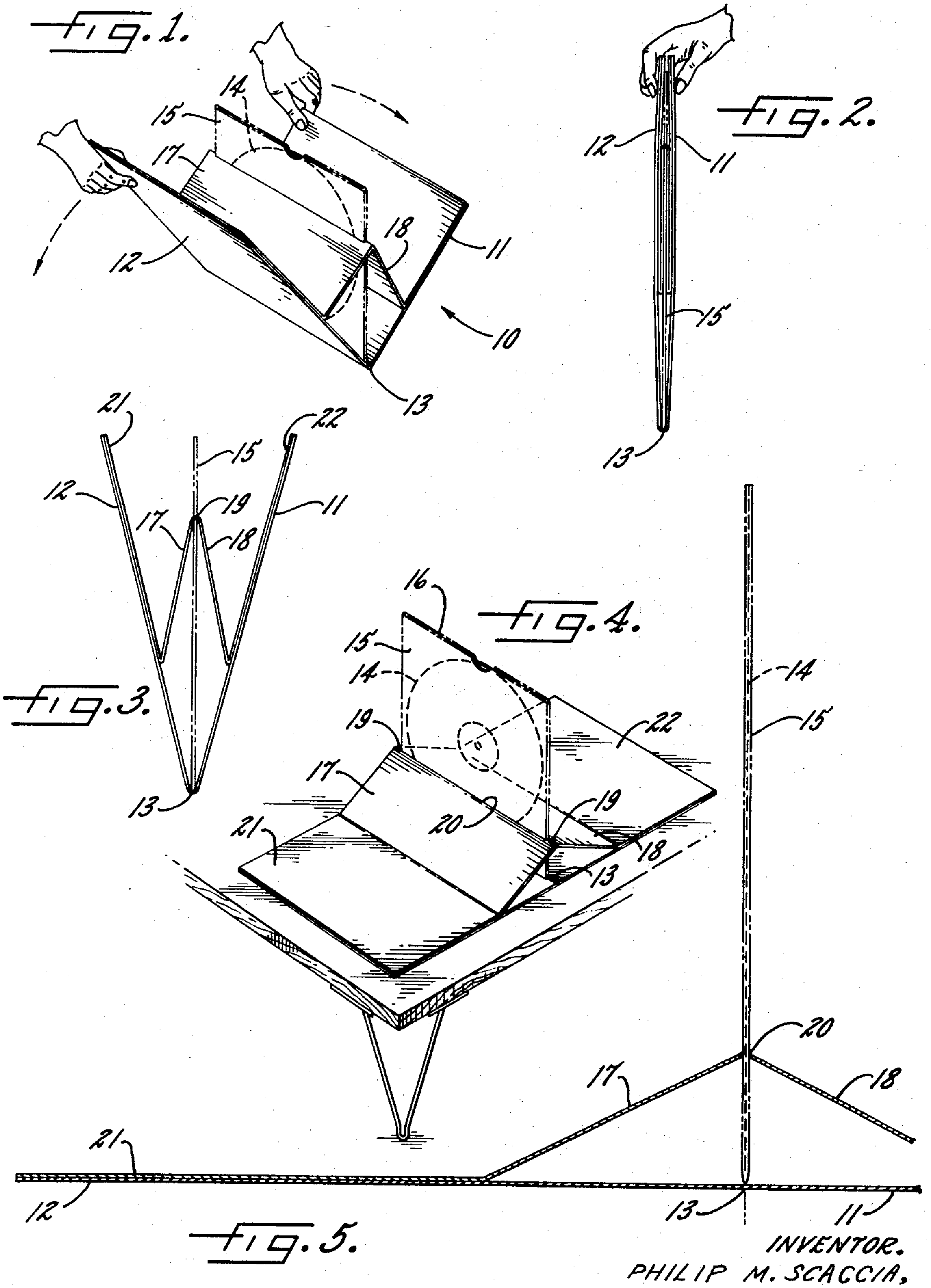
FIG. 1 is a perspective of a phonograph record folder exemplifying the present invention, with the folder being shown in a partially opened position.
FIG. 2 is an end elevation of the folder of FIG. 1, with the folder being shown in the closed position.
FIG. 3 is an end elevation similar to FIG. 2 with the folder partially opened.
FIG. 4 is a perspective similar to FIG. 1, with the folder in the fully opened position.
FIG. 5 is an enlarged end elevation of the folder of the foregoing figures in the fully opened position.

While the invention will be described in connection with a particular exemplary embodiment, it will be understood that it is not intended to so limit the invention, but it is instead intended to cover all alternative and equivalent constructions as may be included within the spirit and scope of the invention as defined by the appended claims.

Turning to the drawings, there is shown in FIG. 1 a phonograph record folder 10 as it would be grasped by the user for opening. The folder 10 comprises a cover member having a front panel 11 and a back panel 12, with the panels 11, 12 being hinged along a central fold line 13.

Folded within the cover panels 11, 12 is a disc phonograph record 14, preferably in a central protective record envelope 15 which has a mouth opening 16 along one edge adapted to receive the disc. The protective envelope 15 is also hinged at the hinge or fold line 13 so that it may be protectively folded between the cover panels 11, 12. The protective envelope 15 is hinged to the cover panels 11, 12 along the edge of the envelope opposite the mouth opening 16.

As thus far described, the phonograph record holder is little different from those holders which have been used in the past, in which a protective envelope has simply been bound inside outer covers to provide a relatively stiff protective covering for the phonograph record inside.

As a principal feature of the invention, however, the disc 14 in its protective envelope 15 is caused to stand upright in a positively supported position as shown in FIGS. 4 and 5 when the cover panels 11, 12 are opened. For this purpose a folding support panel or liner is provided, consisting of a front support 17 and a rear support 18. The support panels 17, 18 are hinged only at their ends at fold points 19, thereby defining a slot opening 20 having a width corresponding to the width of the protective record envelope 15.

In order to present the disc 14 in an upright position, the ends of the support panels 17, 18 opposite the slot 20 and hinge points 19 are themselves hinged to the cover panels 11, 12 along fold lines parallel to and spaced from the main hinge 13 by a distance somewhat less than the width of the support panels 17, 18. As best shown in FIG. 5, the resulting structure forms a pair of opposed right triangles, or a single equilateral triangle which is bisected by the disc 14 and protective record envelope 15. The resulting structure supports the phonograph record within its envelope 15 when the cover panels 11, 12 are in the open position (FIG. 5) while folding inwardly when the cover panels are brought together (FIG. 3) to form a compact flat package suitable for shelf storage (FIG. 2).

As a further feature of the invention, the record folder herein described may be easily and inexpensively constructed by fabricating the cover panels 11, 12 from a single sheet of relatively heavy, protective material which is then folded on a crease or hinge line 13 to form the front and back covers 11, 12. To this member is added a support or liner member consisting of the two support panels 17, 18, and front and rear cover liner panels 21, 22. Preferably, the liner panel consists of a single section of sheet material, and is then simply folded or creased to form the separate individual panel members 17, 18, 21, 22. The central slot 20 for receiving the protective envelope 15 is then formed and the hinge points 19 may be reinforced with a tape hinge, if desired.

In keeping with the invention, the liner panel previously described is attached to the cover panel by adhesive or other suitable means, with the end portions in registry so that the support panels 17, 18 are caused to assume an upraised position (FIGS. 4 and 5) when the cover panels 11, 12 are in a flat position. The resulting construction utilizes very little more material than prior record folder designs in which a double thickness of material was required anyway for the front and rear covers in order to provide necessary strength. In the present invention, the addition of a slight extra amount of material in the support panels 17, 18 allows the construction to provide the useful advantage of supporting the record upright in its protective envelope 15 for insertion or removal. When the folder is closed (FIG. 2), the support panels 17, 18 are compactly doubled up within the central portion of the folder, supplying additional strength against bending or other damage at this point.

The following is claimed as invention:

1. A phonograph record folder for presenting an enclosed record in an upright position upon opening, comprising, in combination, a cover panel of relatively heavy protective material, said cover being hinged at its midpoint to fold upon itself to define front and rear covers;

a support panel having a length exceeding that of said cover panel, said support panel being foldable about its midpoint and having a slot opening therein for receiving and supporting a disc phonograph record;

said support panel further having front and rear folds equidistant from and parallel to said midpoint slot defining central and end sections; and said end sections being attached to said front and rear covers with the terminal edges of each member in registration whereby the support member is caused to buckle upwardly about its folds in triangular cross-section when said cover member is laid flat, and to fold in upon itself when said cover member is closed.

2. A record folder as defined in claim 1 including a record envelope with one open edge, said envelope being hinged between said covers opposite said open edge along said cover panel hinge and being retained within the slot opening of said support panel.

3. A protective folder for phonograph records comprising in combination, a record envelope having an open mouth along one edge thereof and adapted to contain a phonograph record;

front and back panels of relatively heavy protective sheet material hinged to each other and to said record envelope along a common fold line on an edge of said envelope opposite said mouth;

a front support panel and a rear support panel each hinged to the other at spaced opposite fold points to define a slot adapted to receive and support said record envelope therein, said support panels being hinged to said front and rear cover panels, respectively, along fold lines parallel to and spaced from the record envelope hinge connection to form an upstanding equilateral triangular support frame for said record jacket when said cover panels are spread open on a flat surface.

References Cited

FOREIGN PATENTS

| | | | |
|---|---|---|---|
| 777,080 | 2/1935 | France | 312—8 |
| 582,670 | 9/1958 | Italy | 312—10 |
| 136,697 | 8/1928 | Switzerland | 312—10 |

PATRICK D. LAWSON, Primary Examiner

U.S. Cl. X.R.

206—62